April 23, 1929.  E. B. THURSTON  1,709,924
ELECTRIC CURRENT CONTROL
Filed June 27, 1919    2 Sheets-Sheet 1
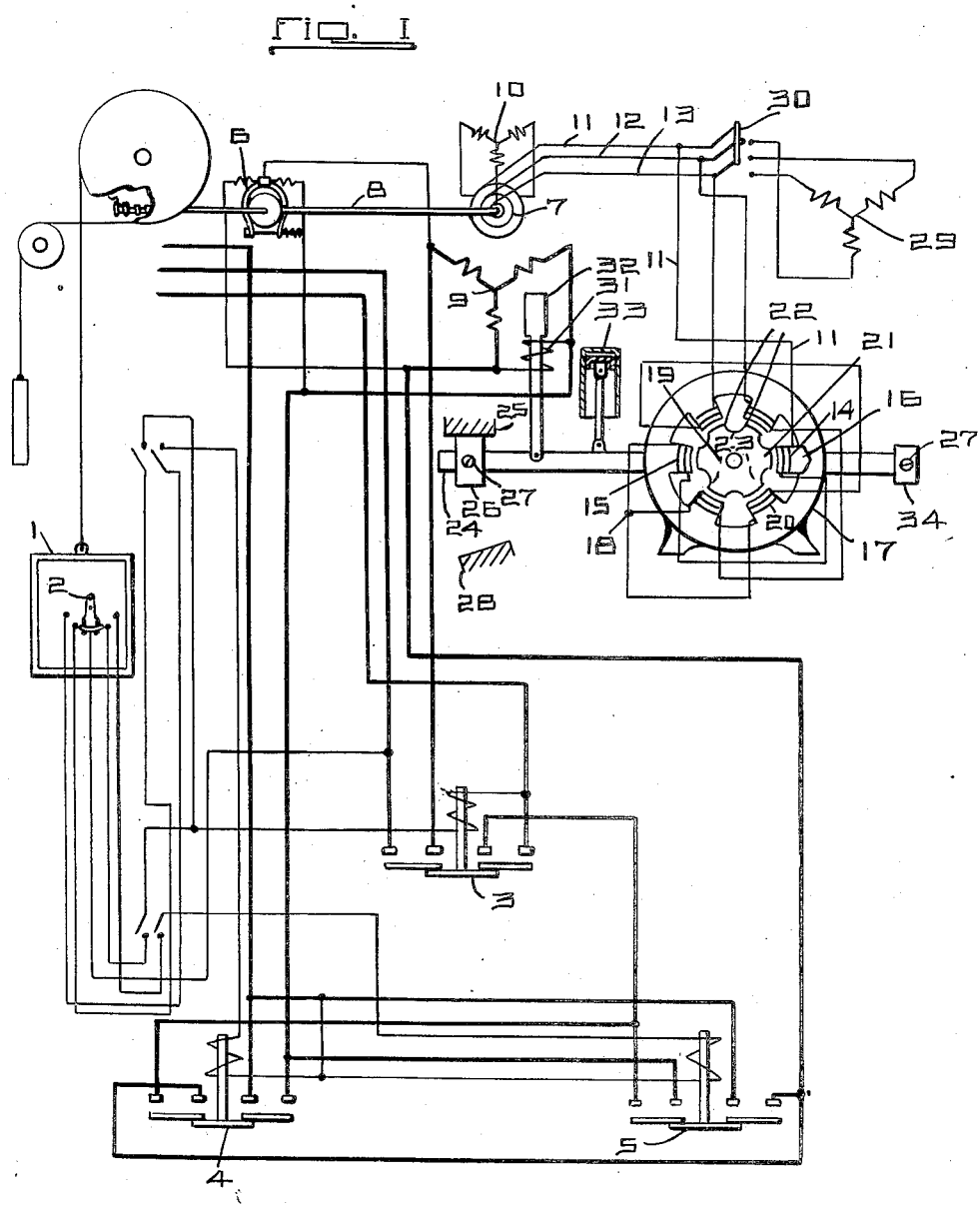

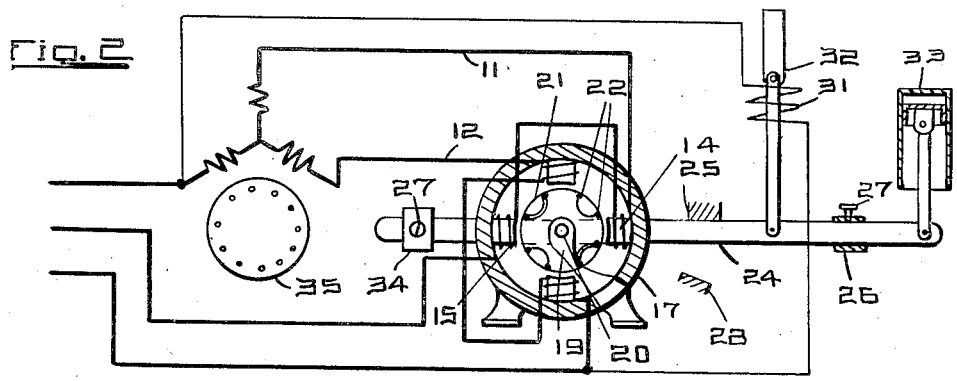
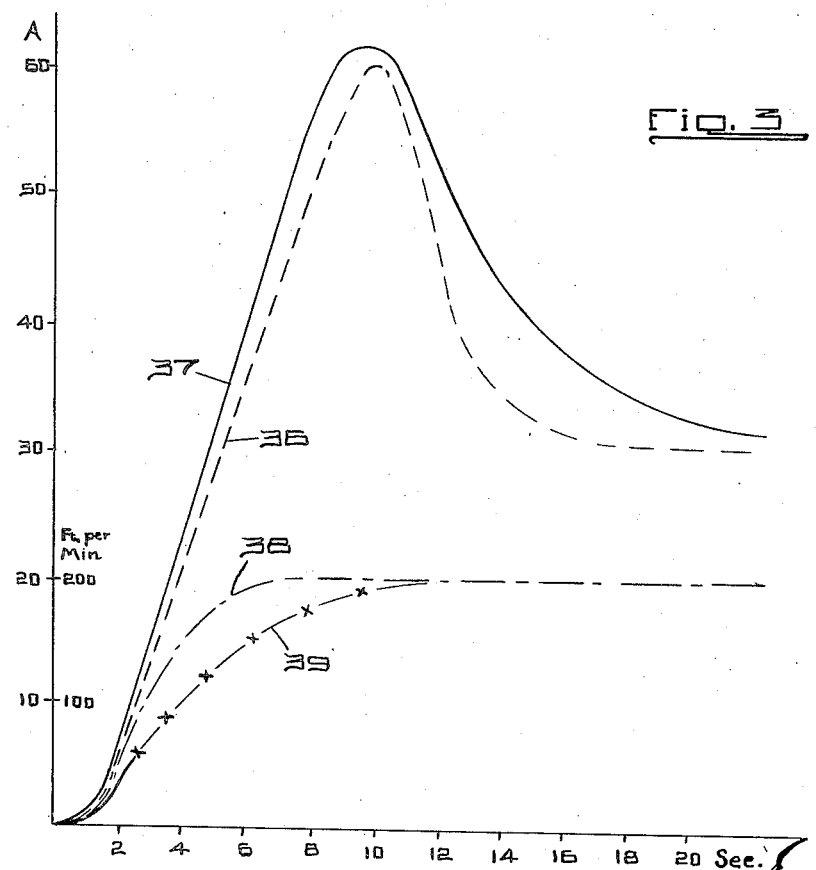

Patented Apr. 23, 1929.

1,709,924

UNITED STATES PATENT OFFICE.

ERNEST B. THURSTON, OF TOLEDO, OHIO, ASSIGNOR TO THE HAUGHTON ELEVATOR & MACHINE CO., OF TOLEDO, OHIO, A CORPORATION OF OHIO.

ELECTRIC-CURRENT CONTROL.

Application filed June 27, 1919. Serial No. 307,245.

This invention relates to the control of fluctuating electric current.

This invention has utility in alternating electric current elevators, with such smoothness of acceleration as to meet the most exacting requirements of passenger service, even at the maximum speed demands.

Referring to the drawings:

Fig. 1 is a wiring diagram of an embodiment of the invention in alternating electric current elevator work;

Fig. 2 is a wiring diagram of the device as adapted to two of the phases of an induction motor; and Fig. 3 is a showing of current and speed curves on a time base, illustrating the smoothness of current consumption and acceleration in attaining designed speed.

Elevator 1 is shown as having a controller 2 therein for starting and stopping the elevator or car 1 by throwing in or out main switch 3, while up or down movement is determined by the control of direction switches 4, 5, from the controller 2. These switches not only effect release of brake 6, so that motor 7 may operate shaft 8 in driving the elevator 1, but also control the motor 7.

The electric motor 7 is shown as supplied with three phase alternating current, and has primary winding 9 and secondary winding 10. Conductor lines 11, 12, 13, extend from slip-rings on the motor where they are connected to the secondary. The line 11 extends similarly about diametrically disposed coils 14, 15, surrounding laminated cores 16, as a fixed primary of a transformer starting device or controller, having outer frame 17. The lines 12, 13, from the other phases of the motor secondary 10, extend to similar diametrically arranged pairs of coils spaced from each other on poles 16 and disposed in an annular series with the the pair of coils from the line 11 for generating a rotating magnetic field. These primary windings of the starting device are in this instance shown as having a star connection at the point 18.

The frame 17 carries bracket or bearing means 19 for a shaft 20 concentrically disposed as to the annular series of coils. This shaft 20 has mounted thereon a member or armature 21 which may have peripherally embedded therein pairs of conductor means or copper bars 22 which are short circuited at the ends by conductor means 23. Each angular shifting of the armature relatively to the frame structure 17 may change the reluctance of the magnetic circuit through the pair of diametric coils and intermediate armature. There is thus provided for each coil an increase in magnetic resistance as by a short circuited conductor in the armature, and such conductor need not be insulated from the armature.

With the position of the armature as shown in Fig. 1 and the short circuited secondary 22, 23, to one side and entirely out of the direct magnetic flux line diametrical of the armature 21 for the opposite poles, such conductors 22, 23, are in reality open secondaries for the induced current, and there is thus drawn only a small exciting current, in the starting device lines 11, 12, 13, which current as passing through the device has practically no effect on the current supplied to the motor 7. As the rotor and stator poles come into alignment as shown in Fig. 1, the air gap therebetween reaches a minimum and the impedance is a maximum. This is contrary to usual circuit position. This position as shown in Fig. 1 is the position to which the armature 21 is automatically thrown by the initial flux in the coils, whether it be minimum air gap or open circuit position, and in order that the quick shifting may not start a rotation or a movement beyond this position, an arm 24 is provided fast with the armature 21, which arm 24 is rocked upward to abut a limit stop 25.

Upon starting the motor 7, the frequency of the current in the coils 14, 15, is a maximum of say sixty. When the motor 7 comes up to synchronous speed, the frequency in the coils 14, 15, is substantially zero. During this starting interval of the motor 7, there is a full range of the holding action of the arm 24 from maximum against the stop 25 to nothing as the arm 24 moves away from said stop. The slowing up of the frequency means less energy and consequently less induced voltage. A weight 26, adjustable by set screw 27, may serve as a mechanical control for tending to oppose the automatic or electric lifting of the arm 24. As the arm 24 is thus caused to move away from the stop 25, there is a reflex upon the current in the coils 14, 15, by this secondary 22, 23, or increased air gap, shifting from, in effect, an open position to a short circuit no voltage position, thus decreasing the inductance. The secondary current for exciting the motor windings 10 say, if starting in so far as the coils 14, 15 are concerned, may be as low as 2 amperes and 100 volts. As the motor 7 approaches speed such may be of a value of 100 amperes at 2 volts even with the resistance 29 in parallel with these coils 14, 15. There is in effect the equivalent of smooth progressive or stepless resistance removal as the current is built up and the armature shifting effects short circuiting. This has been a gradual change as the motor attained acceleration, and is automatically controlled with such acceleration, as modified by the weight or mechanical control of the arm 24.

The mechanical control may be adjusted to be effective at a desired frequency, say when the frequency in the coils 14, 15, has dropped to five, the arm 24 may abut fixed stop 28, in which position the induced current short circuiting coils 22, 23, of the starting device secondary may be about one half over the magnetic circuit direct path, or the half of full short-circuiting position.

In larger motor work, it is desirable to use laminated cores 16 in the controller device. With the hysteresis and eddy losses thus reduced, it may then be desirable to introduce in parallel with the control device of this disclosure, and in the secondary of the motor 7, a resistance 29, herein shown as controllably connected by a switch 30 thereto as a resistive current consuming means.

Refinements in the adjustment of the control shifting of the secondary as the motor builds up speed, may occur, not only in adjusting the weight 26, but in actuating the arm 24 from starting position by having a coil 31 energized simultaneously with the coils 14, 15, to operate a core 32 toward the arm 24. Lag in this travel may be given the desired time interval by dash pot 33. In addition to the kick of the coils to throw the short circuit aside or to minimize the air gas, acceleration in this travel to starting position may be effected by a counterweight 34. As the frequencies of the currents in the coils 14, 15, approach zero the holding up action is weakened and the settling of the arm 24 may be accelerated by the coil 31 pulling the core 32. The fully settled position may be set to occur at a frequency of say six.

The frequency of the supply current may also be a factor in determining whether or not the resistance 29 should be used. In sixty cycle large horsepower work, armature 21, as well as cores 16 may desirably be laminated. Such resistance 29 would take the starting current for the motor 7, while the reactance coils 14, 15, would take care of the short circuited low frequency or running current, as a by-pass for the resistance 29. This means there is a secondary current for starting torque, steplessly cut out automatically with no terminals. There is thus an automatic elimination of excessive slippage and the motor in its own action at once pulls up to designed speed instead of say to 75% thereof, as might be the case were the resistance left in.

Fig. 2 shows the adaptation of the device to an induction motor of the squirrel cage type, with the device connected up in but two phases of the three phase circuit, and these in the supply circuit of the motor. There is thus provided an automatic electric polyphase control starting device of a transformer type and stepless, as well as terminalless, for motor 35. Here there is not a weakening due to decrease in frequency but the time interval for the starting control is determined by the dash pot 33 retarding the throw of the core 32 in cutting down the impedance of the device as the motor 35 comes to speed.

In the form of device shown in Fig. 2 the weight 34 normally overcomes weight 26 so as to hold the parts in starting position until positively driven therefrom by magnetic means 31 and 32.

While reference is made in some of the claims to a regulating device for starting the motor, it will be readily understood that the same device may be used in low speed connections when decelerating from high speed, as is usual with starting resistance.

Fig. 3 shows smooth current consumption curve 36 as brought about with the starting device of this disclosure, the motor starting light, or not under heavy load. Curve 37 shows the change in the curve when starting under heavy load. If the weight adjustment on the arm 24 be such as to keep the reactance of the transformer device in action until the motor attains speed, there is a material pulling down of the peak, or maximum current consumption of the motor on starting.

These smooth current-taking curves in starting the motor reflect directly upon the motor acceleration as shown by curve 38 for starting under light load, and by curve 39 for a start under heavy load in bringing up to designed speed. The great importance of this smooth or uniform starting is present in many power drives, and its lengthening of the life of the driven mechanisms, as well as reduction of danger from accident. In the adaptation herein specifically in point, there is by this device rendered practical from a single motor drive, high speed passenger elevator actuation from alternating electric current source. Furthermore, such has exceptional advantages, in that there are no noise creating moving parts; there are no great current carrying terminals to arc by opening and closing; there is a minimizing, if not full elimination of external resistance; there are no steps. It is all gradual and simplified in attaining full response to designed load and speed conditions. The lower or smaller installations may have in their cast structures sufficient hysteresis and eddy losses so that resistance 29 may be superfluous.

What is claimed and it is desired to secure by Letters Patent is:—

1. In combination, an alternating current polyphase motor and a current flow regulating device for the motor, said device comprising a series of magnetism producing coils in a single magnetic member and connected with a plurality of the phase windings of the motor and a single oscillatable member varying the regulating action of all of said coils of the device in accordance with the position of the last said member with respect to the coils, energization of said coils tending to oscillate the member in one direction, and magnetic means operable to overcome the force of said coils and oscillate said member in the opposite direction.

2. In combination, an alternating current polyphase motor and a current flow regulating device for the motor, said device comprising a set of magnetism producing coils, connected with a plurality of the phase windings of the motor and a single oscillatable member varying the flow regulating effect of all of said coils of the device in accordance with the position of the member relative to said coils, the member and coils being so related that energization of the coils producing a rotating field in either direction urges the member in one direction, and magnetic means connected to the current supply of the motor and operable to overcome the effect of said coils and oscillate said member in the opposite direction.

3. In combination, an alternating current polyphase motor, a starting impedance controller for the motor, said controller comprising a series of magnetism producing coils in a single magnetic member and connected with a plurality of the phase windings of the motor and a single oscillatable member varying the impedance of all of said coils in accordance with its position relative to said coils, energization of said coils tending to oscillate the member in one direction, and magnetic means operable to overcome the effect of said coils and oscillate said member in the opposite direction.

4. In combination, an alternating current polyphase motor, a starting impedance controller for the motor, said controller comprising a set of magnetism producing coils having their axes radiating from a common center and connected with a plurality of the phase windings of the motor, a single oscillatable member associated with said series of coils to vary the impedance of all of said coils in accordance with the position of said member, the member and coils being so related that energization of the coils producing a rotating field in either direction urges the member in one direction, and magnetic means connected to the current supply of the motor and operable to overcome the effect of said coils and oscillate said member in the opposite direction.

5. In combination, an alternating electric current motor, means for supplying current to the motor, coil means connected to said motor for producing a rotating magnetic field, a relatively shiftable induced current conducting member arranged to affect current flow in the coil means in accordance with its position relative to said field, and magnetic means connected with the current supply of the motor for shifting said member.

6. A polyphase alternating current electric motor, coil means independent of the motor connected to a plurality of phase windings of the motor, said coil means comprising a series of coils having their axes radiating from a common center and a core oscillating about said center, the core and coils being arranged to vary the proportion of the magnetic flux to the current in the coil means by oscillation of the core, the flow of current through the coils producing a rotating field urging the core in one direction, and magnetic means connected with the current supply to the motor for urging the core in the opposite direction.

7. An alternating electric current supply, a motor for taking current from said supply, coil means connected to said motor for generating a rotating magnetic field, and a relatively shiftable induced current conducting member shiftable by said field and affecting current flow in the coil means for controlling the current consumption of the motor.

8. An alternating electric current supply, a motor for taking current from said supply, coil means continuously connected to said motor for having generated therein a rotating magnetic field from current as delivered thereto by said supply, a core for the coil means providing poles for the rotating magnetic field, and an induced current conducting member relatively shiftable as to the core by the current in the coil means for affecting the magnetic circuit of the core.

9. A motor, and a rotating magnetic field controller for the motor, said controller having its primary windings energized from the windings of the motor and having a short circuited secondary winding, an armature in which said secondary is mounted, and means mounting said armature to permit shifting thereof relatively to said primary windings as affected by reaction between said controller primary and secondary windings.

10. A polyphase motor having windings, a single controller for the motor including an annular series of coils interconnected with said windings, and a coil actuated rockable armature concentrically disposed as to said coils, said armature including short circuited conductor circuits for induced currents from the coils for affecting current flow through said windings.

11. A polyphase motor having windings, a single controller for the motor including an annular series of coils interconnected with said windings for affecting current flow through said windings, an armature concentrically disposed as to said coils and relatively rockable by said coils, a bearing for the armature, and means for limiting the rocking of the armature as to its bearing.

12. A polyphase motor having windings, a single controller for the motor including an annular series of coils interconnected with said windings for affecting current flow through said windings, an armature concentrically disposed as to said coils and rockable by said coils, an armature shift limiting arm, and controlling means for the arm.

13. A polyphase motor having windings, a single controller for the motor including an annular series of coils interconnected with said windings for affecting current flow through said windings, an armature concentrically disposed as to said coils and rockable by said coils, an arm extending from said armature, and an adjustable weight for the arm.

14. An alternating electric current motor, main and direction switches therefor, connections providing starting resistance including resistance in connection with the motor windings, and additional control means for decreasing the effect of resistance as to the motor embodying independently of said motor a rotating field device thrown into action by said switches.

15. In combination, an alternating current polyphase motor and a current flow regulating device for the motor, said device comprising a set of magnetism producing coils connected with the motor windings for producing a rotating magnetic field by said coils, and a single relatively oscillatable member forming a closed circuit for an induced current outside of the motor circuit and varying the flow regulating effect on all of said coils of the device in accordance with the position of said relatively oscillatable member with respect to said coils.

16. In combination, an alternating current polyphase motor and a starting impedance controller for the motor, said controller comprising a set of magnetism producing coils connected with a plurality of the phase windings of the motor for producing a rotating magnetic field by said coils, and a single relatively oscillatable member forming a closed circuit for an induced current outside of the motor circuit and varying the impedance of all of said coils in accordance with its position relative to said coils.

17. An alternating electric current supply, a motor for taking current from said supply, coil means connected to said motor for generating a rotating magnetic field, and a relatively shiftable induced current conducting member affecting current flow in the coil means for controlling the current consumption of the motor, the relative position of said induced current conducting member being determined by magnetism produced by said current supply.

In witness whereof I affix my signature.

ERNEST B. THURSTON.